United States Patent
Padial et al.

(10) Patent No.: US 12,128,962 B2
(45) Date of Patent: Oct. 29, 2024

(54) WHEEL HOUSING STRAKES FOR A VEHICLE

(71) Applicant: GM Global Technology Operations LLC, Detroit, MI (US)

(72) Inventors: Lucas Mozelli Padial, San Paulo (BR); Danilo Alcantara de Oliveira, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 286 days.

(21) Appl. No.: 17/835,114

(22) Filed: Jun. 8, 2022

(65) Prior Publication Data

US 2023/0399062 A1  Dec. 14, 2023

(51) Int. Cl.
*B62D 37/02* (2006.01)
*B62D 25/18* (2006.01)

(52) U.S. Cl.
CPC ............. *B62D 37/02* (2013.01); *B62D 25/18* (2013.01)

(58) Field of Classification Search
CPC ................................ B62D 25/18; B62D 37/02
See application file for complete search history.

(56) References Cited

U.S. PATENT DOCUMENTS

| | | | | |
|---|---|---|---|---|
| 2010/0213737 A1* | 8/2010 | Hirano | ................. | B62D 35/008 296/181.5 |
| 2015/0123419 A1* | 5/2015 | Werum | ................. | B62D 25/20 296/193.06 |

FOREIGN PATENT DOCUMENTS

| | | | | | |
|---|---|---|---|---|---|
| EP | 0937633 A1 | * | 8/1999 | ............. | B60B 19/10 |
| JP | 2015009749 A | * | 1/2015 | | |
| JP | 2020040662 A | * | 3/2020 | | |
| WO | WO-2017109312 A1 | * | 6/2017 | ................. | B60S 1/68 |

* cited by examiner

*Primary Examiner* — Daniel J Colilla
(74) *Attorney, Agent, or Firm* — CANTOR COLBURN LLP

(57) ABSTRACT

A wheel housing for a vehicle includes an axially facing surface, a curvilinear surface extending outwardly from the axially facing surface, and a plurality of strakes protruding outwardly from one of the axially facing surface and the curvilinear surface. The plurality of strakes conditioning an air flow produced by a vehicle wheel.

20 Claims, 5 Drawing Sheets

WHEEL HOUSING STRAKES FOR A VEHICLE

INTRODUCTION

The subject disclosure relates to the art of vehicles and, more particularly, to strakes provided on wheel housing surfaces of a vehicle.

Vehicles include a number of surfaces that are exposed to air flows. The surfaces include various properties which, when exposed to the air flows, generate drag. The various properties can include shape, location, surface texture, and the like. Designers endeavor to tailor the properties and/or redirect the air flows in order to reduce the drag. Systems for reducing drag include the inclusion of spoilers and surface contours that direct the air flows in a manner that reduces drag. Drag lowers vehicle efficient and increases fuel usage. Given the impact on fuel economy, both of fossil fuels and of vehicle battery life, manufacturers are constantly seeking new areas for drag reduction opportunities.

SUMMARY

In accordance with a non-limiting example, a wheel housing for a vehicle includes an axially facing surface, a curvilinear surface extending outwardly from the axially facing surface, and a plurality of strakes protruding outwardly from one of the axially facing surface and the curvilinear surface. The plurality of strakes conditioning an air flow produced by a vehicle wheel.

In addition to one or more of the features described herein the plurality of strakes extend across the axially facing surface.

In addition to one or more of the features described herein the plurality of strakes extend along the curvilinear surface.

In addition to one or more of the features described herein the plurality of strakes extend along the axially facing surface and the curvilinear surface, the plurality of strakes having a curvilinear shape including an arc which follows a direction of rotation of the vehicle wheel.

In addition to one or more of the features described herein one or more of the plurality of strakes protrude outwardly from the one of the axially facing surface and the curvilinear surface at least 10 mm.

In addition to one or more of the features described herein one or more of the plurality of strakes includes a curvilinear cross-section.

In addition to one or more of the features described herein the curvilinear cross-section is circular.

In addition to one or more of the features described herein one or more of the plurality of strakes includes a rectangular cross-section.

In addition to one or more of the features described herein the rectangular cross-section defines a square.

In addition to one or more of the features described herein one or more of the plurality of strakes includes an angular cross-section.

In accordance with another non-limiting example, a vehicle includes a body defining a passenger compartment. The body includes a plurality of wheel housings, and a corresponding plurality of wheels disposed in the plurality of wheel housings. Each of the plurality of wheel housings includes an axially facing surface that is opposite to an axial inner surface of the corresponding one of the plurality of wheels, and a curvilinear surface extending outwardly from the axially facing surface. The curvilinear surface being opposite to a tread surface of the corresponding one of the plurality of wheels. A plurality of strakes protrude outwardly from one of the axially facing surface and the curvilinear surface. The plurality of strakes condition air flow produced by the corresponding one of the plurality of wheels.

In addition to one or more of the features described herein the plurality of strakes extend across the axially facing surface.

In addition to one or more of the features described herein the plurality of strakes extend along the curvilinear surface.

In addition to one or more of the features described herein the plurality of strakes extend along the axially facing surface and the curvilinear surface, the plurality of strakes having a curvilinear shape including an arc which follows a direction of rotation of the corresponding one of the plurality of vehicle wheels.

In addition to one or more of the features described herein one or more of the plurality of strakes protrude outwardly from the one of the axially facing surface and the curvilinear surface at least 10 mm.

In addition to one or more of the features described herein one or more of the plurality of strakes includes a curvilinear cross-section.

In addition to one or more of the features described herein the curvilinear cross-section is circular.

In addition to one or more of the features described herein one or more of the plurality of strakes includes a rectangular cross-section.

In addition to one or more of the features described herein the rectangular cross-section defines a square.

In addition to one or more of the features described herein one or more of the plurality of strakes includes an angular cross-section.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 4A is a cross-sectional view of one of the plurality of strakes, in accordance with a non-limiting example;

FIG. 4B is a cross-sectional view of one of the plurality of strakes, in accordance with another non-limiting example;

FIG. 4C is a cross-sectional view of one of the plurality of strakes, in accordance with yet another non-limiting example;

FIG. 4D is a cross-sectional view of one of the plurality of strakes, in accordance with still another non-limiting example.

DETAILED DESCRIPTION

Figure 1:
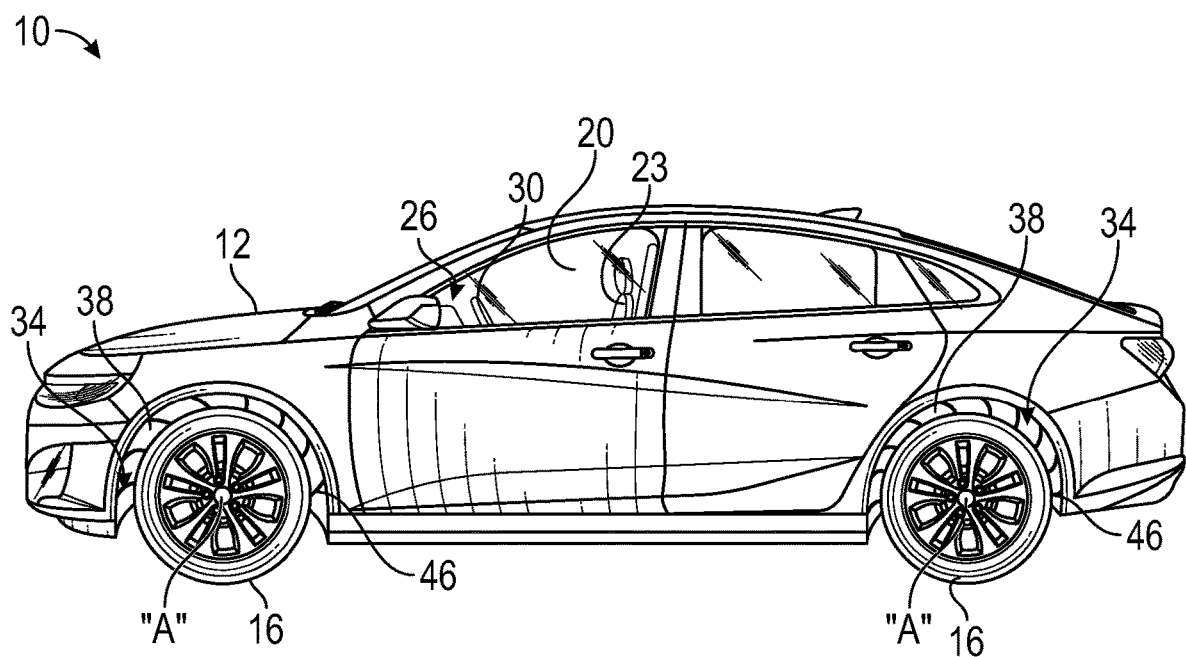
FIG. 1 depicts a vehicle including a wheel housing having a plurality of strakes, in accordance with a non-limiting example.

The following description is merely exemplary in nature and is not intended to limit the present disclosure, its application or uses. It should be understood that throughout the drawings, corresponding reference numerals indicate like or corresponding parts and features.

A vehicle, in accordance with a non-limiting example, is indicated generally at 10 in FIG. 1. Vehicle 10 includes a body 12 supported on a plurality of wheels 16. At least one of the plurality of wheels 16 is a steerable wheel. That is, changing a position of at least the one of the plurality of wheels 16 relative to body 12 will cause vehicle 10 to change direction. In the non-limiting example shown, both front wheels (not separately labeled) of the plurality of wheels 16 are steerable. Body 12 defines, in part, a passenger compartment 20 having seats 23 positioned behind a dashboard 26. A steering control 30 is arranged between seats 23 and dashboard 26. Steering control 30 is operated to control orientation of the steerable wheel(s).

Figure 2:
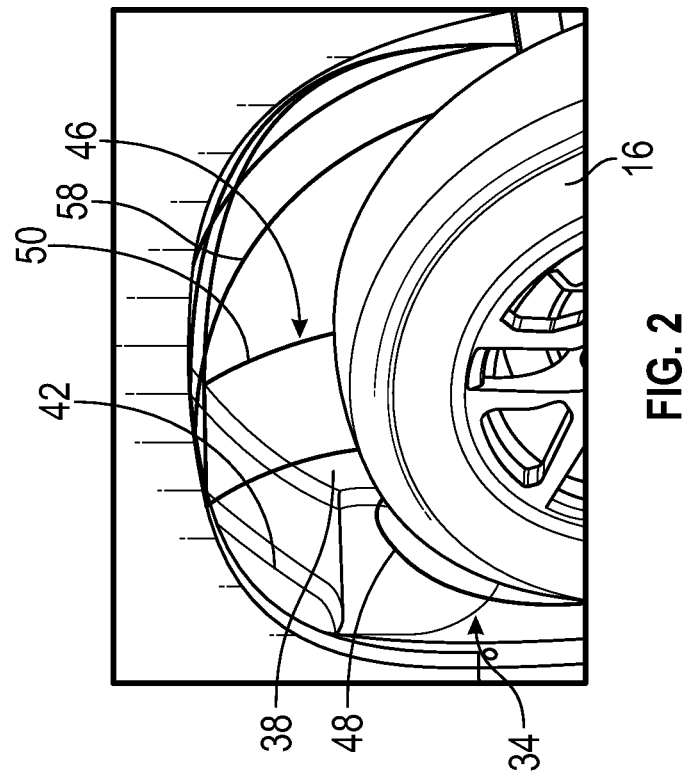
FIG. 2 is a wheel housing including a plurality of strakes, in accordance with a non-limiting example.

In a non-limiting example, each of wheels 16 is arranged in a wheel housing 34. Each wheel housing 34 includes an axially facing surface 38 and a curvilinear surface 42 (FIG. 2). It should be understood that axially facing surface 38 describes a surface of wheel housing 34 that extends outwardly of an axis of rotation "A" of each wheel 16. Axially facing surface 38 faces an inner axial surface (not shown) of each wheel 16. Curvilinear surface 42 should be understood to represent the surface of wheel housing 34 that is opposite to a tread surface (also not shown) of each wheel 16.

Figure 5:
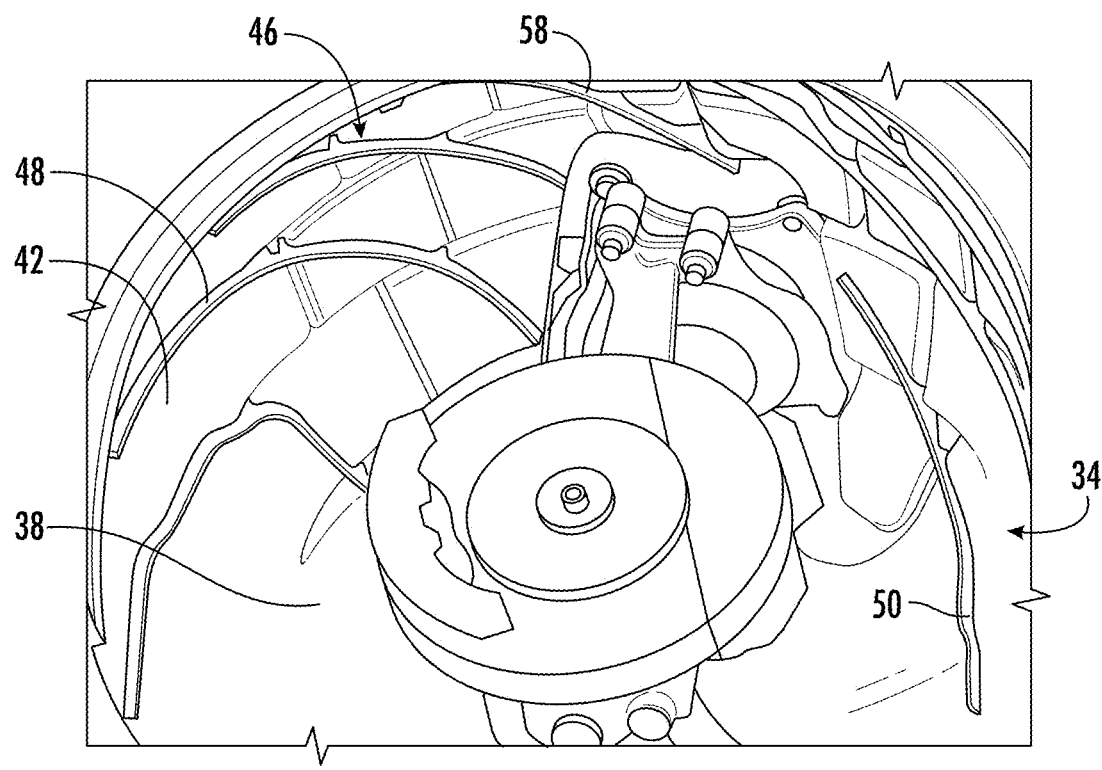
FIG. 5 is a wheel housing including a plurality of strakes, in accordance with a non-limiting example.

In accordance with a non-limiting example, each wheel housing 34 includes a plurality of strakes 46 that interact with air currents or wakes coming from wheel 16 when vehicle 10 is in motion. The interaction between the wakes and the plurality of strakes results in a reduction in drag on vehicle 10 thereby reducing fuel, (e.g., fossil, or electric), consumption. In a non-limiting example shown in FIGS. 2 and 5, each of the plurality of strakes 46 includes a curvilinear shape (not separately labeled) including a first portion 48 that extends along curvilinear surface 42 and a second portion 50 that extends along axially facing surface 38. First portion 48 includes an arc 58 that extends in a direction opposite to a direction of rotation of wheel 16 when vehicle 10 is traveling forward.

Figure 3:
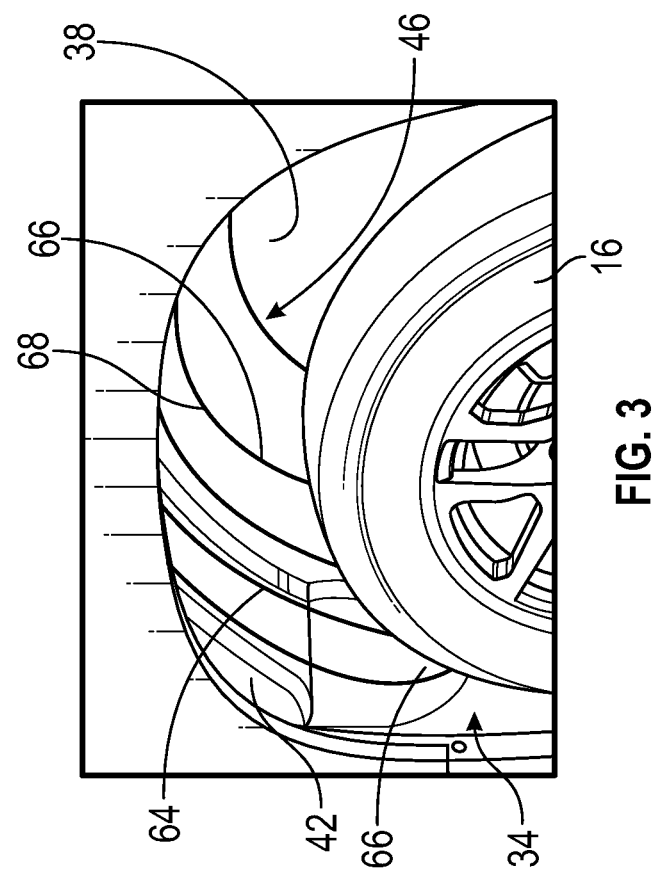
FIG. 3 is a wheel housing including a plurality of strakes in accordance with another non-limiting example.
Figure 6:
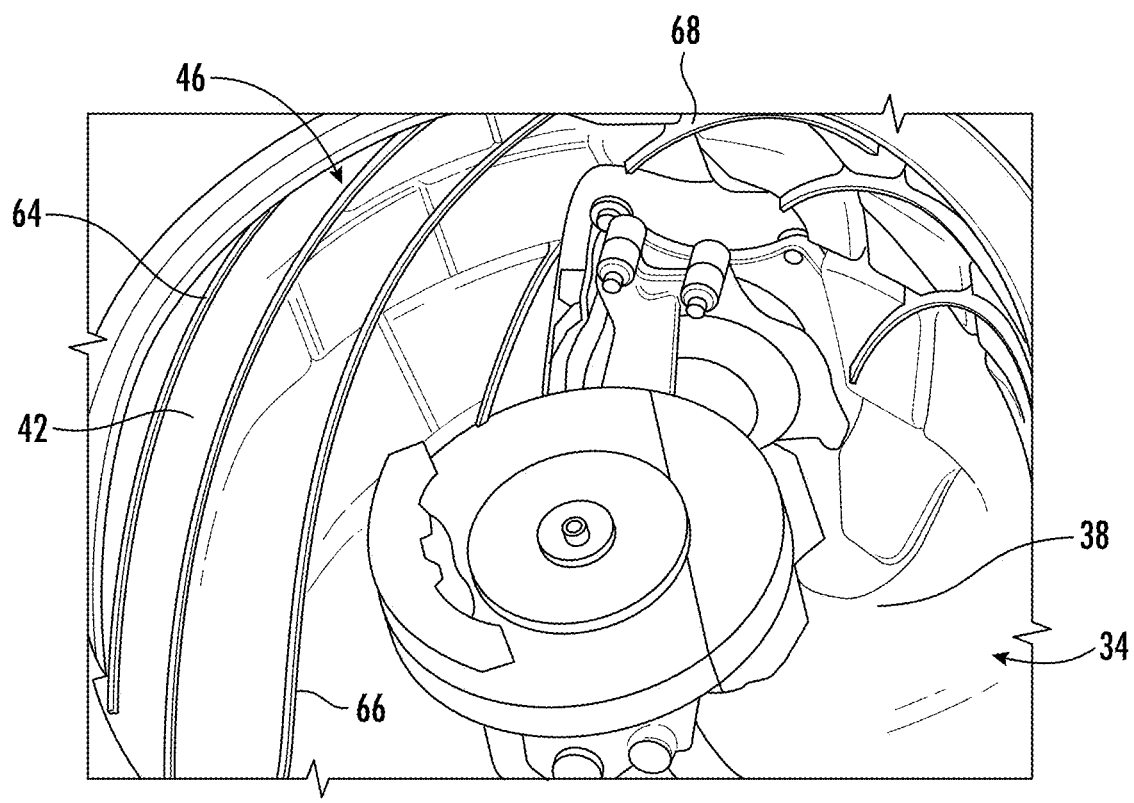
FIG. 6 is a wheel housing including a plurality of strakes, in accordance with a non-limiting example.

In another non-limiting example shown in FIGS. 3 and 6, each of the plurality of strakes 46 includes a curvilinear shape (not separately labeled) including a first portion 64 that extends along curvilinear surface 42 and a second portion 66 that extends along axially facing surface 38. First portion 64 includes an arc 68 that extends in a direction of rotation of wheel 16 when vehicle 10 is traveling forward. Plurality of strakes 46 interact with air currents or wakes coming from wheel 16 when vehicle 10 is in motion. The interaction between the wakes and the plurality of strakes 46 results in a reduction in drag on vehicle 10 in accordance with a non-limiting example.

Figure 4E:
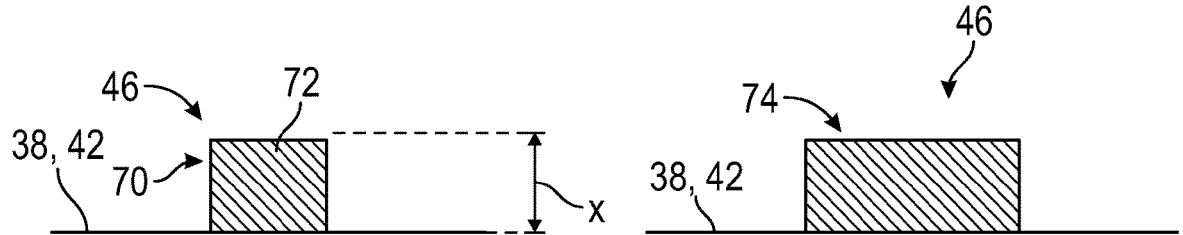
FIG. 4E is a cross-sectional view of one of the plurality of strakes, in accordance with still yet another non-limiting example.
Figure 4E:
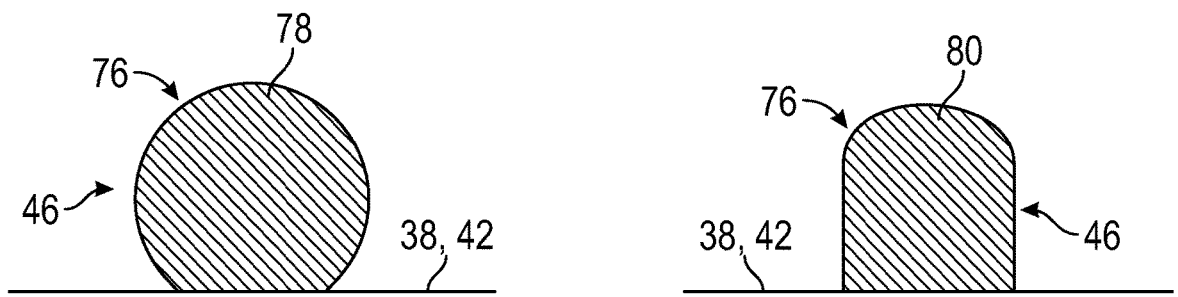
Figure 4E:
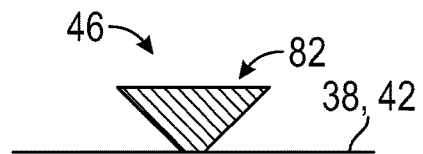

In a non-limiting example shown in FIG. 4A, each of the plurality of strakes 46 includes a generally rectangular cross-section 70. In the non-limiting example shown in FIG. 4A, the rectangular cross-section 70 defines a square 72. In a non-limiting example, each of the plurality of strakes 46 protrudes from axially facing surface 38 and curvilinear surface 42 as shown in FIG. 2 a distance "x" as shown in FIG. 4A. Distance "x" can be about 10 mm. FIG. 4B illustrates one of the plurality of strakes 46 having a rectangular cross-section 74. FIG. 4C depicts one of the plurality of strakes 46 having a curvilinear cross-section 76. Curvilinear cross-section 76 is a generally circular cross-section 78. In FIG. 4D curvilinear cross-section 76 is shown in the form of a semi-circular cross-section 80. FIG. 4E depicts one of the plurality of strakes 46 having a generally triangular cross-section 82.

At this point, it should be understood that the particular shape of each of the plurality of strakes may vary. Further, it should be understood that the thickness of each of the plurality of strakes may vary. Also, the thickness of one or more of the strakes may vary between the first portion and the second portion. Finally, the degree that each of the plurality of strakes protrudes from the corresponding one of axially facing surface and the curvilinear surface may vary. The particular properties of the plurality of strakes may vary depending on vehicle and/or wheel aerodynamics including design, shape, propulsion, materials, and the like.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A wheel housing for a vehicle that includes a wheel, the wheel housing comprising:
    a first surface that faces a direction parallel to an axis of rotation of the wheel;
    a curvilinear surface extending outwardly from the first surface; and
    a plurality of strakes protruding outwardly from one of the first surface and the curvilinear surface, the plurality of strakes conditioning air flow produced by a vehicle wheel,
    wherein the plurality of strakes extend along the first surface and the curvilinear surface, the plurality of strakes having a curvilinear shape including an arc which follows a direction of rotation of the vehicle wheel.

2. The wheel housing according to claim 1, wherein the plurality of strakes extend across the first surface.

3. The wheel housing according to claim 1, wherein the plurality of strakes extend along the curvilinear surface.

4. The wheel housing according to claim 1, wherein one or more of the plurality of strakes protrude outwardly from the one of the first surface and the curvilinear surface at least 10 mm.

5. The wheel housing according to claim 1, wherein one or more of the plurality of strakes includes a curvilinear cross-section.

6. The wheel housing according to claim 5, wherein the curvilinear cross-section is circular.

7. The wheel housing according to claim 1, wherein one or more of the plurality of strakes includes a rectangular cross-section.

8. The wheel housing according to claim 7, wherein the rectangular cross-section defines a square.

9. The wheel housing according to claim 1, wherein one or more of the plurality of strakes includes an angular cross-section.

10. The wheel housing according to claim 1, wherein one or more of the plurality of strakes includes a cross-section that includes two straight sides that terminate at a curved end.

11. A vehicle comprising a wheel housing comprising:
a body defining a passenger compartment, the body including a plurality of wheel housings, and a corresponding plurality of wheels disposed in the plurality of wheel housings, each of the plurality of wheel housings comprising:
   a first surface that faces a direction parallel to an axis of rotation of the wheels that is opposite to an axial inner surface of the corresponding one of the plurality of wheels;
   a curvilinear surface extending outwardly from the first surface, the curvilinear surface being opposite to a tread surface of the corresponding one of the plurality of wheels; and
a plurality of strakes protruding outwardly from one of the first surface and the curvilinear surface, the plurality of strakes conditioning air flow produced by the corresponding one of the plurality of wheels,
wherein the plurality of strakes extend along the first surface and the curvilinear surface, the plurality of strakes having a curvilinear shape including an arc which follows a direction of rotation of the corresponding one of the plurality of vehicle wheels.

12. The vehicle according to claim 11, wherein the plurality of strakes extend across the first surface.

13. The vehicle according to claim 11, wherein the plurality of strakes extend along the curvilinear surface.

14. The vehicle according to claim 11, wherein one or more of the plurality of strakes protrude outwardly from the one of the first surface and the curvilinear surface at least 10 mm.

15. The vehicle according to claim 11, wherein one or more of the plurality of strakes includes a curvilinear cross-section.

16. The vehicle according to claim 15, wherein the curvilinear cross-section is circular.

17. The vehicle according to claim 11, wherein one or more of the plurality of strakes includes a rectangular cross-section.

18. The vehicle according to claim 17, wherein the rectangular cross-section defines a square.

19. The vehicle according to claim 11, wherein one or more of the plurality of strakes includes an angular cross-section.

20. The vehicle according to claim 11, wherein one or more of the plurality of strakes includes a cross-section that includes two straight sides that terminate at a curved end.

* * * * *